United States Patent
Han et al.

(10) Patent No.: US 12,536,765 B2
(45) Date of Patent: Jan. 27, 2026

(54) METHOD AND APPARATUS WITH REGION OF INTEREST EXTRACTION

(71) Applicant: SAMSUNG ELECTRONICS CO., LTD., Suwon-si (KR)

(72) Inventors: Dasol Han, Suwon-si (KR); Seungjun Shin, Suwon-si (KR); Suji Kim, Suwon-si (KR); Dokwan Oh, Suwon-si (KR); Dongwon Jang, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 362 days.

(21) Appl. No.: 18/296,603

(22) Filed: Apr. 6, 2023

(65) Prior Publication Data
US 2024/0144634 A1    May 2, 2024

(30) Foreign Application Priority Data
Nov. 1, 2022    (KR) .................. 10-2022-0143630

(51) Int. Cl.
*G06V 10/25* (2022.01)
*G06T 5/00* (2024.01)
*G06T 5/70* (2024.01)
*G06V 10/98* (2022.01)

(52) U.S. Cl.
CPC ............... *G06V 10/25* (2022.01); *G06T 5/70* (2024.01); *G06V 10/993* (2022.01)

(58) Field of Classification Search
CPC ......... G06V 10/25; G06V 10/993; G06T 5/70
See application file for complete search history.

(56) References Cited

U.S. PATENT DOCUMENTS

| | | | |
|---|---|---|---|
| 7,724,972 B2 | 5/2010 | Wang et al. | |
| 8,150,155 B2 | 4/2012 | El-Maleh et al. | |
| 8,537,409 B2* | 9/2013 | Marchesotti | G06V 10/464 382/218 |
| 8,823,745 B2* | 9/2014 | Francois | A63F 13/213 345/638 |
| 9,025,910 B2* | 5/2015 | Liu | H04N 19/40 382/280 |
| 9,262,670 B2 | 2/2016 | Pietilä | |

(Continued)

FOREIGN PATENT DOCUMENTS

| | | |
|---|---|---|
| KR | 10-2011-0024971 A | 3/2011 |
| KR | 10-2183847 B1 | 11/2020 |

OTHER PUBLICATIONS

Petsiuk, Vitali, et al. "Black-box explanation of object detectors via saliency aps." *Proceedings of the IEEE/CVF Conference on Computer Vision and Pattern Recognition.* 2021.

(Continued)

*Primary Examiner* — Gregory M Desire
(74) *Attorney, Agent, or Firm* — Sughrue Mion, PLLC (57) ABSTRACT

An apparatus with region of interest (ROI) extraction includes: a processor configured to: generate an input image by distorting an original image comprising one or more objects; determine, based on the original image, a quality score of the input image using a machine learning model that is trained based on a mean opinion score (MOS) dataset; generate a class activation map for the input image based on the quality score of the input image; and extract an ROI from the original image based on the class activation map.

19 Claims, 5 Drawing Sheets

(56) References Cited

U.S. PATENT DOCUMENTS

| | | | |
|---|---|---|---|
| 10,909,671 B2 | 2/2021 | Kimura et al. | |
| 11,132,797 B2* | 9/2021 | Mao | G06T 7/0012 |
| 11,151,417 B2* | 10/2021 | Laradji | G06V 10/82 |
| 11,216,698 B2* | 1/2022 | Colligan | G06T 5/20 |
| 11,363,298 B2* | 6/2022 | Lee | H04N 19/172 |
| 11,373,313 B2* | 6/2022 | Obayashi | G06N 3/08 |
| 11,880,966 B2* | 1/2024 | Lee | H04N 19/103 |
| 11,961,314 B2* | 4/2024 | Derks | G06V 10/255 |
| 12,051,191 B2* | 7/2024 | Yoshida | G06V 10/32 |
| 12,094,253 B2* | 9/2024 | Shin | G06T 7/75 |
| 2017/0150148 A1 | 5/2017 | Zhang et al. | |
| 2022/0036059 A1 | 2/2022 | He et al. | |

OTHER PUBLICATIONS

Borji, Ali, Dicky N. Sihite, and Laurent Itti. "Quantitative analysis of human-model agreement in visual saliency modeling: A comparative study." *IEEE Transactions on Image Processing* 22.1 (2012): 55-69.

\* cited by examiner

METHOD AND APPARATUS WITH REGION OF INTEREST EXTRACTION

CROSS-REFERENCE TO RELATED APPLICATIONS

This application claims the benefit under 35 USC § 119(a) of Korean Patent Application No. 10-2022-0143630, filed on Nov. 1, 2022 in the Korean Intellectual Property Office, the entire disclosure of which is incorporated herein by reference for all purposes.

BACKGROUND

1. Field

The following description relates to a method and apparatus with region of interest (ROI) extraction.

2. Description of Related Art

A method may recognize an object of an image or video. Region of interest (ROI) extraction methods may include, for example, a saliency detection method that estimates where a person's gaze is most likely to be located in an image or video, and methods used to recognize the features learned by a recognizer in the process of learning using deep learning. However, the aforementioned methods do not guarantee that the human gaze may be spread evenly across all objects in an image or video, and when the recognizer tries to extract two or more objects as an ROI, the priorities of the classes may not be known, and there is a problem in that there is no guarantee that the classes are actually included in the ROI. Accordingly, an ROI extraction apparatus implementing the aforementioned methods may have low accuracy and reliability.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In one general aspect, an apparatus with region of interest (ROI) extraction includes: a processor configured to: generate an input image by distorting an original image comprising one or more objects; determine, based on the original image, a quality score of the input image using a machine learning model that is trained based on a mean opinion score (MOS) dataset; generate a class activation map for the input image based on the quality score of the input image; and extract an ROI from the original image based on the class activation map.

For the extracting of the ROI, the processor may be configured to extract the ROI by binarizing the class activation map.

The class activation map may include a plurality of pixels, one or more portions of the plurality of pixels may have different pixel values, and for the extracting of the ROI, the processor may be configured to extract the ROI from the original image based the different pixel values of the plurality of pixels of the class activation map and a threshold value.

For the extracting of the ROI, the processor may be configured to determine pixels of the plurality of pixels of the class activation map having pixel values higher than the threshold value as included in the ROI.

For the generating of the input image, the processor may be configured to generate the input image by blurring the original image.

The processor may be configured to: for the generating of the input image, generate a plurality of different input images by distorting the original image using a plurality of different random masks; for the determining of the quality score, determine a quality score of each of the plurality of different input images; and for the extracting of the ROI, extract the ROI based on the quality score of each of the plurality of different input images.

The plurality of different random masks may be configured to distort different regions of the original image, and the processor may be configured to: determine a quality score of the original image; and, for the extracting of the ROI, extract the ROI based on a difference between the quality score of each of the plurality of different input images and the quality score of the original image.

For the determining of the quality score, the processor may be configured to input the original image and the input image as an input to the machine learning model.

The processor may be configured to: quantize pixel values of pixels included in the ROI and convert the quantized pixel values into a block-based data map; and generate a compressed image in which the original image is compressed, based on the block-based data map.

In another general aspect, an apparatus with region of interest (ROI) extraction includes: a processor configured to: determine a quality score of an input image using a machine learning model that is trained based on a mean opinion score (MOS) dataset; generate a class activation map for the input image based on the quality score of the input image; and extract an ROI from an original image of the input image based on the class activation map.

For the extracting of the ROI, the processor may be configured to extract the ROI by binarizing the class activation map.

The class activation map may include a plurality of pixels, one or more portions of the plurality of pixels may have different pixel values, and, for the extracting of the ROI, the processor may be configured to extract the ROI from the original image based on the different pixel values of the plurality of pixels of the class activation map and a threshold value.

In another general aspect, a processor-implemented method with region of interest (ROI) extraction includes: determining a quality score of an input image distorted from an original image comprising one or more objects, using a machine learning model trained based on a mean opinion score (MOS) dataset; generating a class activation map for the input image based on the quality score of the input image; and extracting an ROI from the original image based on the class activation map.

The extracting of the ROI from the original image based on the class activation map may include extracting the ROI by binarizing the class activation map.

The class activation map may include a plurality of pixels, one or more portions of the plurality of pixels may have different pixel values, and the extracting of the ROI from the original image based on the class activation map may include extracting the ROI from the original image based the different pixel values of the plurality of pixels of the class activation map and a threshold value.

The method may include generating the input image by distorting the original image, and the determining of the quality score of the input image may include determining the quality score of the input image based on the original image.

The method may include generating a plurality of different input images by distorting the original image using a plurality of different random masks, the determining of the quality score of the input image may include determining quality scores of each of the plurality of different input images, and the extracting of the ROI may include extracting the ROI from the original image based on the quality scores of each of the plurality of different input images.

In another general aspect, one or more embodiments include a non-transitory computer-readable storage medium storing instructions that, when executed by one or more processors, configure the one or more processors to perform any one of, any combination of, or all operations and methods described herein.

Other features and aspects will be apparent from the following detailed description, the drawings, and the claims.

Throughout the drawings and the detailed description, unless otherwise described or provided, the same drawing reference numerals will be understood to refer to the same elements, features, and structures. The drawings may not be to scale, and the relative size, proportions, and depiction of elements in the drawings may be exaggerated for clarity, illustration, and convenience.

DETAILED DESCRIPTION

The following detailed description is provided to assist the reader in gaining a comprehensive understanding of the methods, apparatuses, and/or systems described herein. However, various changes, modifications, and equivalents of the methods, apparatuses, and/or systems described herein will be apparent after an understanding of the disclosure of this application. For example, the sequences of operations described herein are merely examples, and are not limited to those set forth herein, but may be changed as will be apparent after an understanding of the disclosure of this application, with the exception of operations necessarily occurring in a certain order. Also, descriptions of features that are known after an understanding of the disclosure of this application may be omitted for increased clarity and conciseness.

Although terms such as "first," "second," and "third", or A, B, (a), (b), and the like may be used herein to describe various members, components, regions, layers, or sections, these members, components, regions, layers, or sections are not to be limited by these terms. Each of these terminologies is not used to define an essence, order, or sequence of corresponding members, components, regions, layers, or sections, for example, but used merely to distinguish the corresponding members, components, regions, layers, or sections from other members, components, regions, layers, or sections. Thus, a first member, component, region, layer, or section referred to in the examples described herein may also be referred to as a second member, component, region, layer, or section without departing from the teachings of the examples.

Throughout the specification, when a component or element is described as being "on", "connected to," "coupled to," or "joined to" another component, element, or layer it may be directly (e.g., in contact with the other component or element) "on", "connected to," "coupled to," or "joined to" the other component, element, or layer or there may reasonably be one or more other components, elements, layers intervening therebetween. When a component or element is described as being "directly on", "directly connected to," "directly coupled to," or "directly joined" to another component or element, there can be no other elements intervening therebetween. Likewise, expressions, for example, "between" and "immediately between" and "adjacent to" and "immediately adjacent to" may also be construed as described in the foregoing.

The terminology used herein is for describing various examples only and is not to be used to limit the disclosure. The articles "a," "an," and "the" are intended to include the plural forms as well, unless the context clearly indicates otherwise. As non-limiting examples, terms "comprise" or "comprises," "include" or "includes," and "have" or "has" specify the presence of stated features, numbers, operations, members, elements, and/or combinations thereof, but do not preclude the presence or addition of one or more other features, numbers, operations, members, elements, and/or combinations thereof.

Unless otherwise defined, all terms, including technical and scientific terms, used herein have the same meaning as commonly understood by one of ordinary skill in the art to which this disclosure pertains specifically in the context on an understanding of the disclosure of the present application. Terms, such as those defined in commonly used dictionaries, are to be interpreted as having a meaning that is consistent with their meaning in the context of the relevant art and specifically in the context of the disclosure of the present application, and are not to be interpreted in an idealized or overly formal sense unless expressly so defined herein.

As used herein, the term "and/or" includes any one and any combination of any two or more of the associated listed items. The phrases "at least one of A, B, and C", "at least one of A, B, or C", and the like are intended to have disjunctive meanings, and these phrases "at least one of A, B, and C", "at least one of A, B, or C", and the like also include examples where there may be one or more of each of A, B, and/or C (e.g., any combination of one or more of each of A, B, and C), unless the corresponding description and embodiment necessitates such listings (e.g., "at least one of A, B, and C") to be interpreted to have a conjunctive meaning.

The features described herein may be embodied in different forms, and are not to be construed as being limited to the examples described herein. Rather, the examples described herein have been provided merely to illustrate some of the many possible ways of implementing the methods, apparatuses, and/or systems described herein that will be apparent after an understanding of the disclosure of this application. The use of the term "may" herein with respect to an example or embodiment, e.g., as to what an example or embodiment may include or implement, means that at least one example or embodiment exists where such a feature is included or implemented, while all examples are not limited thereto.

Hereinafter, examples will be described in detail with reference to the accompanying drawings. When describing the example embodiments with reference to the accompanying drawings, like reference numerals refer to like elements and any repeated description related thereto will be omitted.

Figure 1:
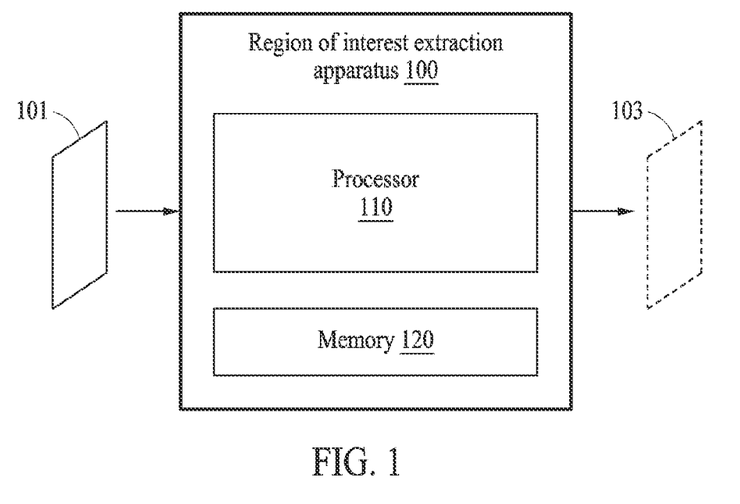
FIG. 1 illustrates an example of a region of interest (ROI) extraction apparatus.

FIG. 1 illustrates an example of a region of interest (ROI) extraction apparatus.

Referring to FIG. 1, a ROI extraction apparatus 100 may include a processor 110 (e.g., one or more processors) and a memory 120 (e.g., one or more memories). The ROI extraction apparatus 100 may further include an image distortion module (e.g., an image distortion module 308 of FIG. 3), a quality evaluation module (e.g., a quality evaluation module 212 of FIG. 2), an extraction module (e.g., an extraction module 214 of FIG. 2), a quantization coefficient generator (e.g., a quantization coefficient generator 510 of FIG. 5), and an image compression module (e.g., an image compression module 520 of FIG. 5). In a non-limiting example, the processor 110 may include the image distortion module, the quality evaluation module, the extraction module, the quantization coefficient generator, and the image compression module.

The processor 110 may control at least one other component of the ROI extraction apparatus 100 and may perform a variety of data processing or computation. According to an example, as at least a portion of data processing or computation, the processor 110 may store instructions or data received from other components in the memory 120, may process the instructions or the data stored in the memory 120, and may store result data in the memory 120.

The memory 120 may store information for the processor 110 to perform the processing operation. For example, the memory 120 may store instructions to be executed by the processor 110 and may store related information while instructions or a program is executed by the ROI extraction apparatus 100. The memory 120 may include a volatile memory such as random-access memory (RAM), dynamic random-access memory (DRAM), and static random-access memory (SRAM), and/or a non-volatile memory known in the art such as a flash memory. For example, the memory 120 may include a non-transitory computer-readable storage medium storing instructions that, when executed by the processor 110, configure the processor 110 to perform any one, any combination, or all of the operations and methods described herein with reference to FIGS. 1-7.

The ROI extraction apparatus 100 may receive an input image 101 and extract an ROI 103. The input image 101 may be an image in which an original image (e.g., an original image 301 of FIG. 3) is distorted. For example, the input image 101 may be an image obtained by converting an original image into a joint photographic experts group (JPEG) format or a better portable graphics (BPG) format, and/or an image obtained by processing a blur of an original image, but a method where the original image is distorted is not limited thereto.

The input image 101 and the original image may include at least one object. At least one object included in the input image 101 and the original image may include the ROI to be extracted (e.g., the ROI that a user intends to extract).

According to an example, the processor 110 may process the input image 101 including at least one object and control it to extract the ROI 103. The processor 110 may determine a quality score of the input image 101 by evaluating the quality of the input image 101. The processor 110 may use a quality evaluation module (e.g., the quality evaluation module 212 of FIG. 2) to evaluate the quality of the input image 101. The quality evaluation module may be, include, or implement a machine learning model. The quality evaluation module may be trained based on a mean opinion score (MOS) dataset. The MOS test may be a method for directly evaluating a quality of an image that a person perceives when viewing it and the MOS dataset may be a data set generated by such a MOS test.

In an example, when evaluating the quality of the input image 101 using the machine learning model, the processor 110 may evaluate the quality of the input image 101 by using the input image 101 as an input without using (e.g., while excluding) the original image as an input, where the original image is the image before the input image 101 is distorted. As a method of the processor 110 to evaluate the quality of the input image 101 without the original image of the input image 101, the processor 110 may perform a no reference image quality assessment method, an example of which will be described in detail below with reference to FIG. 2.

In an example, when evaluating the quality of the input image 101 using the machine learning model learned based on the MOS dataset, the processor 110 may refer to the original image, which is the image before the input image 101 is distorted. When the ROI extraction apparatus 100 of one or more embodiments evaluates the quality of the input image 101 by referring to the original image, the quality score of the input image 101 determined by the ROI extraction apparatus 100 of one or more embodiments may be more accurate and/or reliable than a quality score of the input image 101 determined by a typical apparatus that evaluates the quality of the input image 101 without referring to the original image. As a method of the processor 110 to evaluate the quality of the input image 110 by referring to the original image of the input image 101, the processor 110 may perform a full reference image quality assessment method, an example of which will be described in detail below in FIG. 3.

After determining the quality score of the input image 101, the processor 110 may generate a class activation map for the input image 101 based on the quality score of the input image 101. The class activation map method may be a method that may be used in the trained machine learning model, and may obtain regions contributing to activating the corresponding class value (or the quality score of the corresponding input image, for example). The class activation map may provide information about which part or parts of the input image 101 has an influence when the machine learning model trained based on the MOS dataset determines the quality score of the input image 101. The class activation map may have a heat map form and at least a portion may include a plurality of pixels including different pixel values.

In an example, the class activation map may be a gradient class activation map (Grad-CAM). An operation of generating the Grad-CAM by the processor 110 may use Equations 1 and 2 below, for example.

$$a_k^c = \frac{1}{Z}\sum_i \sum_j \frac{\partial y^c}{\partial A_{i,j}^k}$$

Equation 1

$$L_{Grad-CAM}^c = ReLU\left(\sum_K a_k^c A^k\right)$$

Equation 2 c may denote a target class. $y^c$ may denote an input value of a softmax layer. $A^k$ may denote a k-th feature map of a last convolutional layer.

$$\frac{\partial y^c}{\partial A_{i,j}^k}$$

may denote a gradient that $y^c$ has for $A^k$. Z may denote the total number of pixels per channel of the feature map. $a_k^c$ denotes the importance of class c of the k-th node and may be the sum of all gradients for class c of the k-th node. A rectified linear unit (ReLU) function may be a non-limiting example of activation function. The ReLU function may output 0 when an input value is 0 or less than 0 and may output the input value as it is when the input value is greater than 0. When $A^k$ of all nodes is obtained as the sum of weights for class c and then converted into a heat map through the ReLU function, it may be defined as a region that has been significantly utilized for the class value. $L_{Grad-CAM}^c$ may mean a gradient class activation map for class c.

The processor 110 may extract the ROI from the original image based on the class activation map. For example, the processor 110 may extract the ROI by binarizing the class activation map. The class activation map may include a plurality of pixels having different pixel values. At least a portion of the plurality of pixels included in the class activation map may have different pixel values. The processor 110 may extract the ROI from the original image based on pixel values of the plurality of pixels included in the class activation map and one or more threshold values.

For example, the processor 110 may determine a pixel having a pixel value lower than a threshold value among a plurality of pixels included in the class activation map as an inactivated region and convert the pixel value to 0, and the processor 110 may determine a pixel having a pixel value higher than the threshold value among the plurality of pixels included in the class activation map as an activated region and convert the pixel value to 1. Pixels having pixel values less than or equal to the threshold value among the plurality of pixels included in the class activation map may be excluded from the ROI, and pixels having pixel values higher than the threshold value among the plurality of pixels included in the class activation map may be included in the ROI. Accordingly, the ROI may be or include all the pixels having pixel values higher than the threshold value.

Even when the total data size of the original image is the same as the data size of the input image 101, the quality score of the input image 101 may vary according to data size allocated to each of at least one object included in the original image. When the total data size of the input image 101 and the original image of the input image 101 is limited, data of an appropriate size may be allocated to each of the at least one object included in the original image in the limited total data. When the original image is distorted to generate the input image 101, the degree of distortion may be reduced as the data size allocated to one object increases. The quality of the image may be improved when more data is allocated to an object in an area of interest to a user among at least one object included in the original image.

For example, the original image of the input image 101 may include a first object "dog" and a second object "tree". When the total data size of the original image is 100, the data size of the first object may be 20, and the data size of the second object may be 80. In this case, when the input image 101 is generated by distorting the original image, the degree of distortion of the first object having a data size of 20 may be greater than the degree of distortion of the second object having a data size of 80. When the total data size of the original image is 100, the data size of the first object may be 80, and the data size of the second object may be 20. In this case, when the input image 101 is generated by distorting the original image, the degree of distortion of the first object having a data size of 80 may be smaller than the degree of distortion of the second object having a data size of 20. When the first object is of interest (e.g., a person is interested in the first object), the processor 110 may adjust the data size allocated to the first object to be larger than the data size allocated to the second object.

According to an example, the processor 110 may evaluate the quality of the input image 101 and extract the ROI from the original image based on the quality score of the input image 101, such that an object that a person focuses on in the input image 101 may be found or determined. The processor 110 may provide a guide for a data size to be allocated for each of at least one object included in the input image 101 by providing the quality score of the input image 101.

Figure 2:
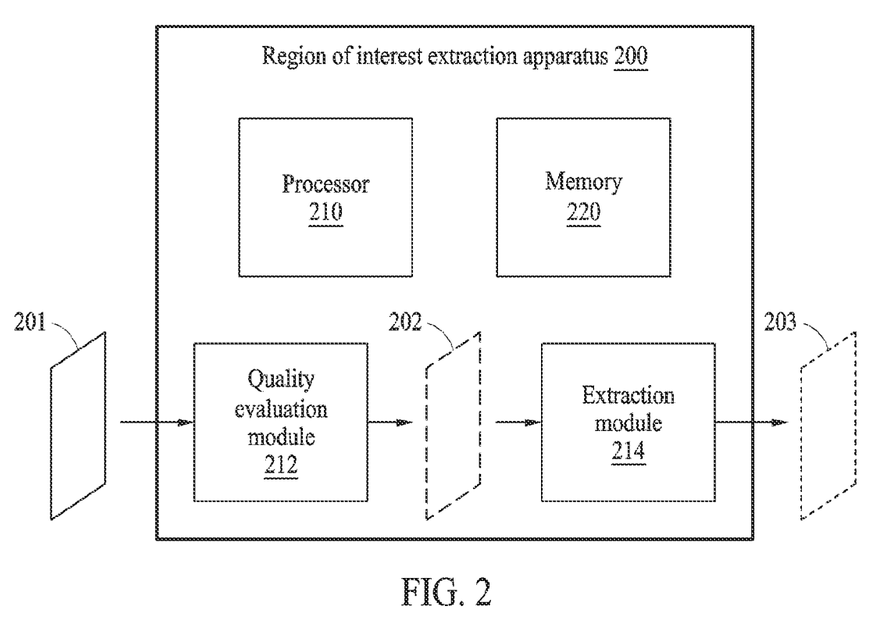
FIG. 2 illustrates an example of an ROI extraction apparatus using a no reference image assessment method.

FIG. 2 illustrates an example of the ROI extraction apparatus using a no reference image assessment method.

Referring to FIG. 2, an ROI extraction apparatus 200 may include a processor 210 (e.g., one or more processors), a memory 220 (e.g., one or more memories), a quality evaluation module 212, and the extraction module 214. A configuration and operation of the memory 220 may be understood with reference to the example described above with reference to FIG. 1. The processor 210 may include and/or perform any one, combination, or all of the functions and operations of the quality evaluation module 212 and the extraction module 214.

According to an example, the ROI extraction apparatus 200 may receive an input image 201. The input image 201 may be an image distorted from the original image, and a description of the input image 201 may be understood with reference to the example described above with reference to FIG. 1. The quality evaluation module 212 may evaluate the quality of the input image 201 without referring to the original image of the input image 201. The quality evaluation module 212 may be, include, or implement a machine learning model trained based on the MOS dataset in which a person sees a random image and subjectively evaluates the quality of the image.

The quality evaluation module 212 may determine the quality score of the input image 101 by evaluating the quality of the input image 101. The quality evaluation module 212 may generate a class activation map 202 for the input image 101 to check or determine which part of the input image 101 influenced the quality score, based on the quality score of the input image 101. The class activation map 202 may be in a heat map from. The class activation map 202 may include a plurality of pixels, in which at least a portion of the plurality of pixels has different pixel values.

The extraction module 214 may extract the ROI from the original image of the input image 201 based on the class activation map 202. A method of extracting the ROI from the original image of the input image 201 based on the class activation map 202 by the extraction module 214 may be understood by referring to the example described with reference to FIG. 1.

Figure 3:
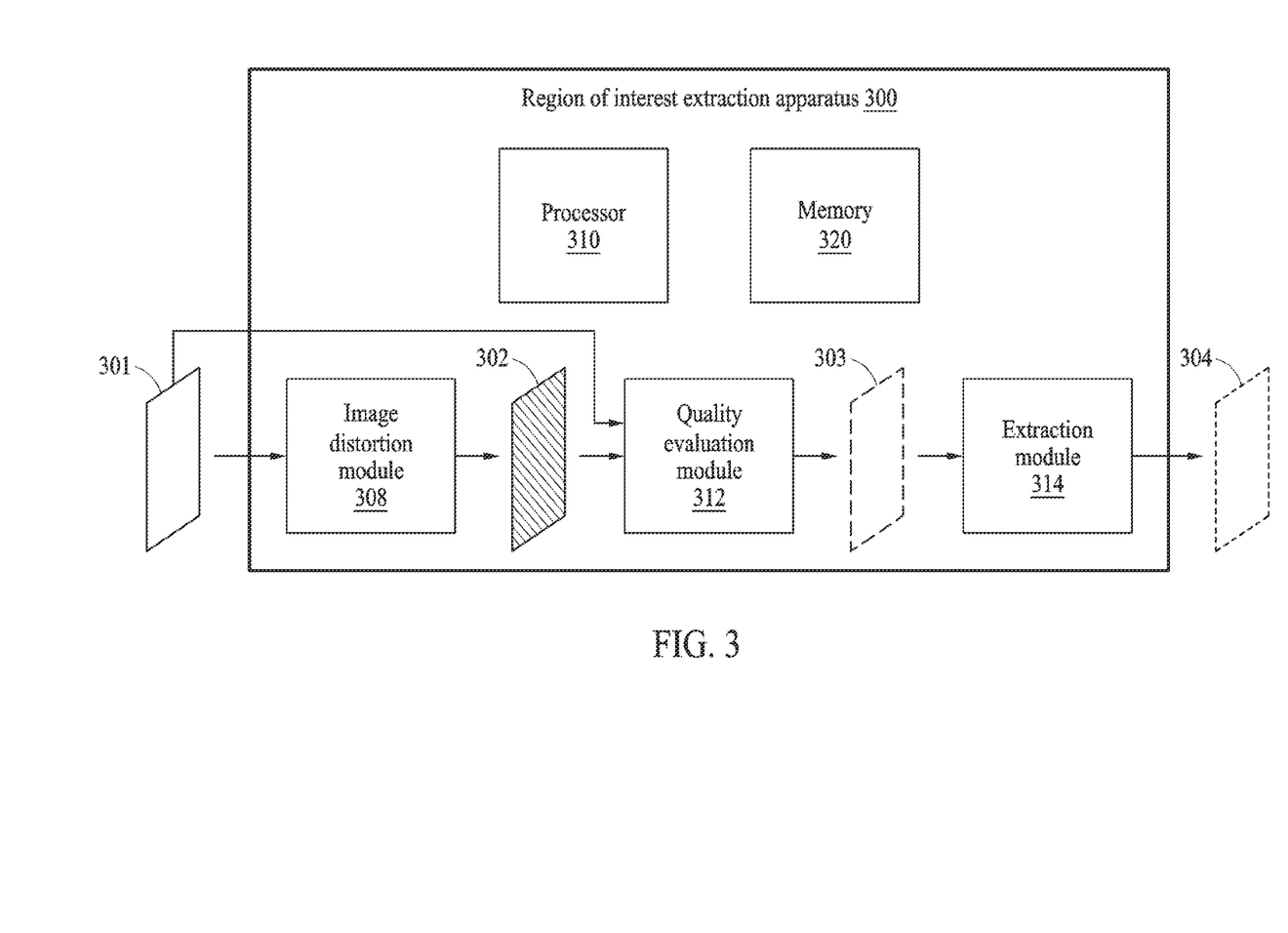
FIG. 3 illustrates an example of an ROI extraction apparatus using a full reference image assessment method.

FIG. 3 illustrates an example of the ROI extraction apparatus using a full reference image assessment method.

Referring to FIG. 3, an ROI extraction apparatus 300 may include a processor 310 (e.g., one or more processors), a memory 320 (e.g., one or more memories), the image distortion module 308, a quality evaluation module 312, and an extraction module 314. The processor 310 may include and/or perform any one, combination, or all of the functions and operations of the image distortion module 308, the quality evaluation module 312, and the extraction module 314. A configuration and operation of the memory 320 may be understood with reference to the example described above with reference to FIG. 1.

According to an example, the ROI extraction apparatus 300 may receive an original image 301. The original image 301 may be a high-definition image captured by a high-definition camera or the like and may be an image without conversion or distortion. The image distortion module 308 may generate an input image 302 by distorting the original image 301. For example, the image distortion module 308 may compress the original image 301 to reduce the total data size of the original image 301, convert the original image 301 to a JPEG or BPG format image, and process a blur on the original image 301, but a method in which the image distortion module 308 distorts the original image 301 is not limited thereto.

The quality evaluation module 312 may receive the original image 301 and the input image 302 in which the original image 301 is distorted as inputs. The quality evaluation module 312 may evaluate the quality of the input image 302 by referring to the original image 301. The quality evaluation module 312 may be different from the quality evaluation module 212 of FIG. 2. For example, the quality evaluation module 212 in FIG. 2 may be, include, or implement a machine learning model trained by evaluating the quality of the input image by receiving only the input image in which the original image is distorted, whereas the quality evaluation module 312 in FIG. 3 may be, include, or implement a machine learning model trained by evaluating the quality of the input image by receiving both the original image and the input image in which the original image is distorted as inputs. When the quality evaluation module 312 of one or more embodiments evaluates the quality of the input image 302 by referring to the original image 301, the quality score of the input image 302 determined by the quality evaluation module 312 may have higher reliability and accuracy than the quality score determined by the quality evaluation module 212 of FIG. 2.

The quality evaluation module 312 may generate a class activation map 303 for the input image 302 based on the quality score of the input image 302. The class activation map 303 may be in a heat map form. The class activation map 303 may include a plurality of pixels, in which at least a portion of the plurality of pixels has different pixel values.

The extraction module 314 may extract an ROI 304 from the original image 301 based on the class activation map 303. The extraction module 314 may extract the ROI by binarizing the class activation map 303. For example, by comparing each of the pixel values of the plurality of pixels included in the class activation map 303 and a threshold value, a pixel having a pixel value higher than the threshold value among the plurality of pixels is converted to 1, and a pixel having a pixel value less than or equal to the threshold value among the plurality of pixels is converted to 0, such that the ROI 304 may be extracted. However, the method in which the extraction module 314 extracts the ROI 304 from the class activation map 303 is not limited thereto.

Figure 4:
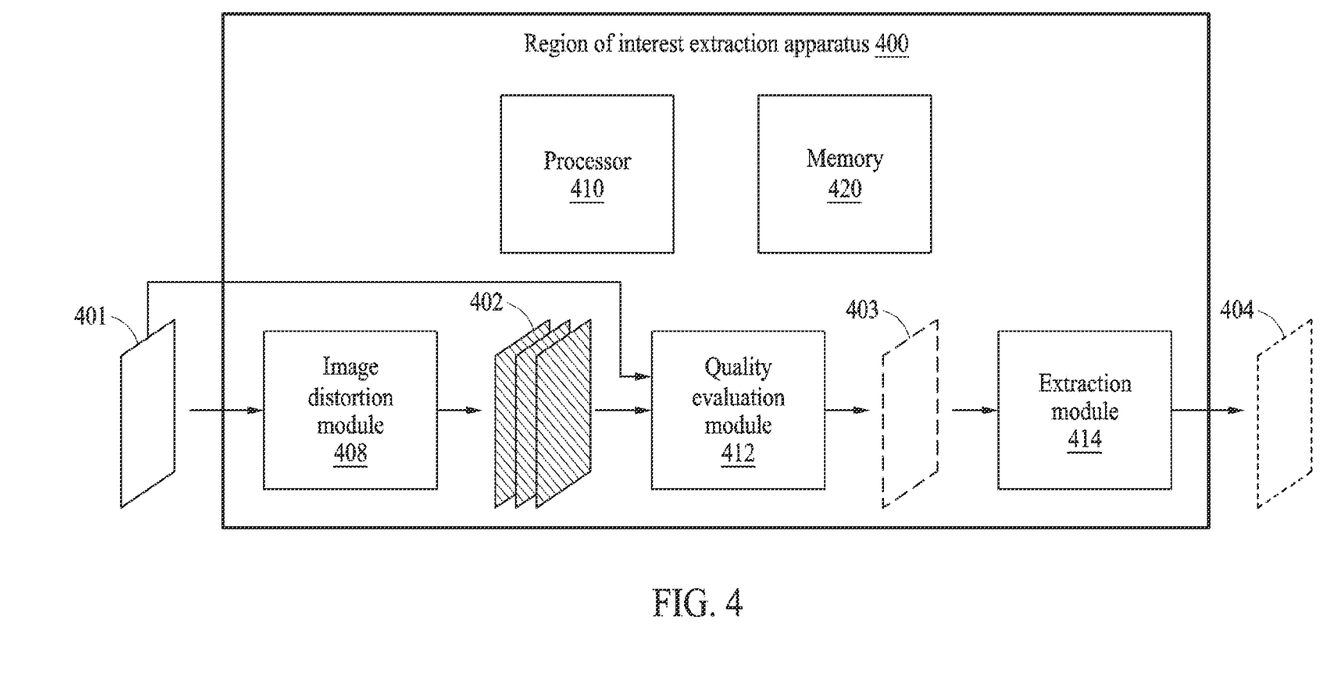
FIG. 4 illustrates an example of an ROI extraction apparatus using a random mask.

FIG. 4 illustrates an example of the ROI extraction apparatus using a random mask.

Referring to FIG. 4, an ROI extraction apparatus 400 may include a processor 410 (e.g., one or more processors), a memory 420 (e.g., one or more memories), an image distortion module 408, a quality evaluation module 412, and an extraction module 414. The processor 410 may include and/or perform any one, combination, or all of the functions and operations of the image distortion module 408, the quality evaluation module 412, and the extraction module 414. A configuration and operation of the memory 420 may be understood with reference to the example described above with reference to FIG. 1.

The ROI extraction apparatus 400 may receive an original image 401 and extract an ROI 404 from an original image. The image distortion module 408 may generate a plurality of different input images 402 by distorting the original image 401 using a plurality of different random masks. Each of the plurality of random masks may serve as a mask that distorts only a portion of the original image 401 and does not distort the remaining regions. Regions where each of the plurality of random masks distorts the original image 401 may be different.

The quality evaluation module 412 may evaluate each quality of the original image 401 and the plurality of different input images 402. When each of the plurality of input images 402 has a different distorted region from the original image 401, quality scores for each of the plurality of input images 402 may be different from each other.

In an example, the original image 401 may include a first object "dog", a second object "tree", and a third object "cloud". The image distortion module 408 may generate a first input image by distorting a region including the first object using a first random mask. The image distortion module 408 may generate a second input image by distorting a region including the second object using a second random mask. The image distortion module 408 may generate a third input image by distorting a region including the third object using a third random mask. When a person subjectively determines the quality of an image including the dog, tree, and cloud, assuming that the person focuses on the dog and determines the quality of the image, the quality score of the first input image may be lower than the quality score of the second input image or the quality score of the third input image.

In response to determining the quality score of the original image 401, the quality evaluation module 412 may set pixel values of all pixels included in the original image 401 as the quality score. For example, when the original image 401 is an image having a size of M×N and the quality score of the original image 401 is determined to be K, pixel values of all M×N pixels may be set to K (however, M and N are natural numbers). When generating a random mask, the quality evaluation module 412 may generate a random mask by allocating a pixel value of 0 to a pixel corresponding to a part to be distorted in the input image 401 and a pixel value of 1 to a pixel corresponding to a part not to be distorted in the input image 401.

The quality evaluation module 412 may multiply quality scores of each of the plurality of different input images 402 generated using a plurality of different random masks by the pixel value of the random mask used to generate the input image. For example, when a first random mask having an M×N size includes a plurality of pixels having pixel values of 0 or 1 and the quality score of a first input image generated by distorting the original image 401 using the first random mask is L, a pixel having a pixel value of 1 in the first random mask may be allocated a pixel value of L and a pixel having a pixel value of 0 in the first random mask may maintain as a pixel value of 0.

The quality evaluation module 412 may subtract a value obtained by multiplying the random mask by the quality score of the input image from the pixel value of the original image 401. The lower the quality score of the input image generated by the random mask, the higher the pixel values of pixels corresponding to the distorted regions of the original image 401 after subtraction. The quality evaluation module 412 may perform the same process as above for input images 402 generated by each of the plurality of random masks, and then add all pixel values of pixels at the same position of each of the original images after the subtraction. When a person subjectively evaluates the quality of an image, a pixel value of a pixel may be high where it has a major influence.

The quality evaluation module 412 may generate a class activation map 403 by adding all pixel values of pixels at the same position of each of the original images after the subtraction and normalizing pixel values of the pixels.

Figure 5:
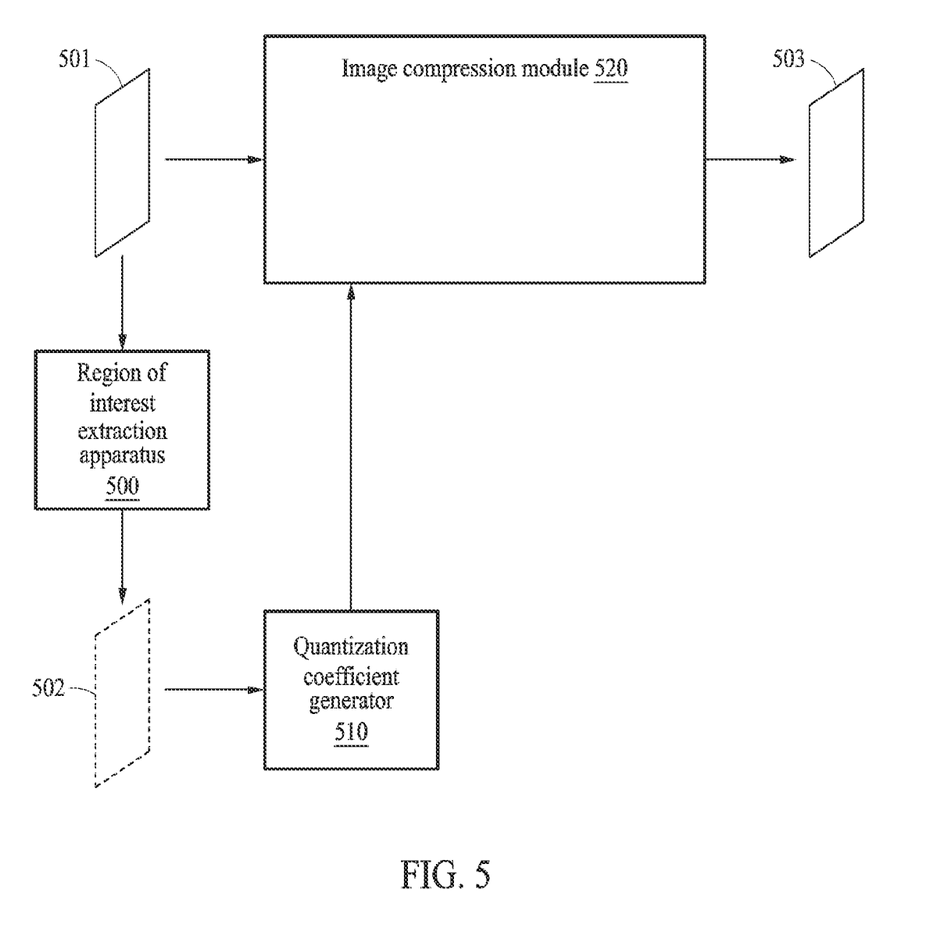
FIG. 5 illustrates an example of an image compression module using an ROI extraction apparatus.

FIG. 5 illustrates an example of an image compression module using the ROI extraction apparatus.

Referring to FIG. 5, an ROI extraction apparatus 500 may receive an input image 501 and extract an ROI 502. As an example, the ROI extraction apparatus 500 may be any one, any combination, or all of the ROI extraction apparatuses described above with reference to FIGS. 1 to 4. A method of extracting the ROI 502 by receiving the input image 501 by the ROI extraction apparatus 500 may be understood by referring to the example described above with reference to FIGS. 1 to 4.

The ROI 502 extracted from the ROI extraction apparatus 500 may include a plurality of pixels, in which at least a portion of the plurality of pixels has different pixel values. A quantization coefficient generator 510 may receive the ROI 502. The quantization coefficient generator 510 may quantize pixel values of each of the plurality of pixels included in the ROI 502 and convert the quantized pixel values into a block-based data map. For example, the quantization coefficient generator 510 may convert the ROI 502 into the block-based data map using a method such as linear transformation, logarithm transformation, or pooling.

An image compression module 520 may receive the original image 501 and the block-based data map output from the quantization coefficient generator 510 and output a compressed image 503 in which the original image 501 is compressed. In a limited bit rate environment of an image, the performance of the image compression module 520 may change depending on how much bit rate is allocated to which area of the image. For example, when a relatively large bit rate is allocated to a background rather than an object that a person focuses on when observing an image, the performance of the image compression module 520 may deteriorate. On the other hand, by allocating a relatively large bit rate to an object that a person focuses on when observing an image, the ROI extraction apparatus 500 of one or more embodiments may improve the performance of the image compression module 520.

Based on the data map generated using the ROI 502 output from the ROI extraction apparatus 500, the image compression module 520 may determine which one of the at least one object included in the original image 501 to allocate a relatively large bit rate. For example, a region corresponding to the ROI 502 output from the ROI extraction apparatus 500 may have a relatively high value in the data map, and the image compression module 520 may allocate a large bit rate to a relatively high value in the data map.

Figure 6:
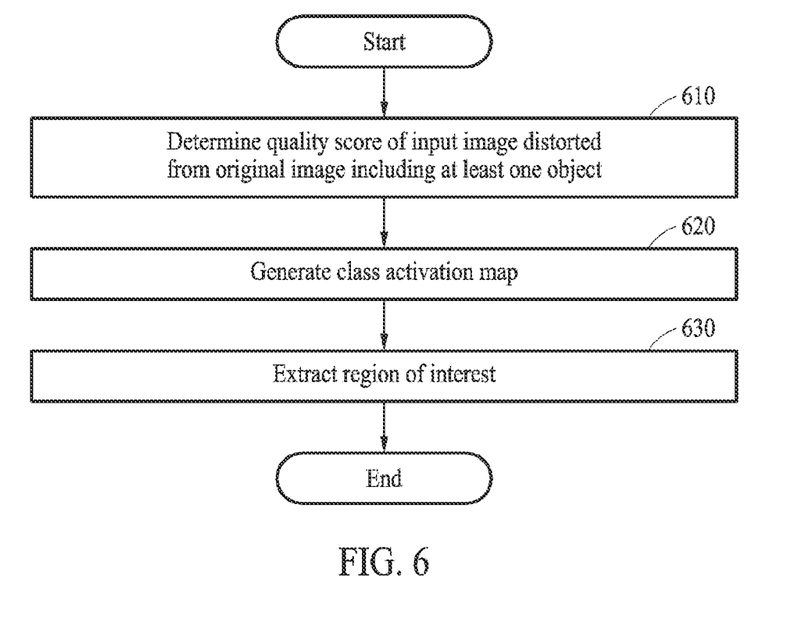
FIG. 6 illustrates an example of an ROI extraction method performed by an ROI extraction apparatus.

FIG. 6 illustrates an example of an operation of the ROI extraction method. As an example, operations 610 through 630 of the method of extracting the ROI to be described hereinafter may be performed by the ROI extraction apparatus 100 in FIG. 1 or the ROI extraction apparatus 200 in FIG. 2. The operations 610 through 630 may be performed sequentially but not necessarily performed sequentially. For example, the order of the operations 610 through 630 may change and two or more of the operations 610 through 630 may be performed in parallel or simultaneously. Further, one or more of operations 610 through 630 may be omitted, without departing from the spirit and scope of the shown example. In addition to the description of FIG. 6 below, the description of FIGS. 1 through 5 is also applicable to FIG. 6 and is incorporated herein by reference.

Referring to FIG. 6, in operation 610, the ROI extraction apparatus may perform an operation of determining a quality score of an input image distorted from an original image including at least one object. In operation 610, the ROI extraction apparatus may use a machine learning model trained based on the MOS dataset when determining the quality score of the input image. In operation 610, the determining of the quality score of the input image by the ROI extraction apparatus may be understood based on the examples described above with reference to FIGS. 1 and 2.

In operation 620, the ROI extraction apparatus may generate a class activation map for the input image based on the quality score of the input image. The class activation map may include a plurality of pixels, in which at least a portion of the plurality of pixels has different pixel values. An operation of generating the class activation map by the ROI extraction apparatus may be understood based on the examples described above with reference to FIGS. 1 and 2.

In operation 630, the ROI extraction apparatus may extract the ROI from the original image based on the class activation map. For example, in operation 630, the ROI extraction apparatus may extract the ROI by binarizing the class activation map. The ROI extraction apparatus may extract the ROI from the original image based on pixel values of the plurality of pixels of the class activation map and threshold values. In operation 630, the extracting of the ROI from the class activation map by the ROI extraction apparatus may be understood based on the example described above with reference to FIGS. 1 and 2.

Figure 7:
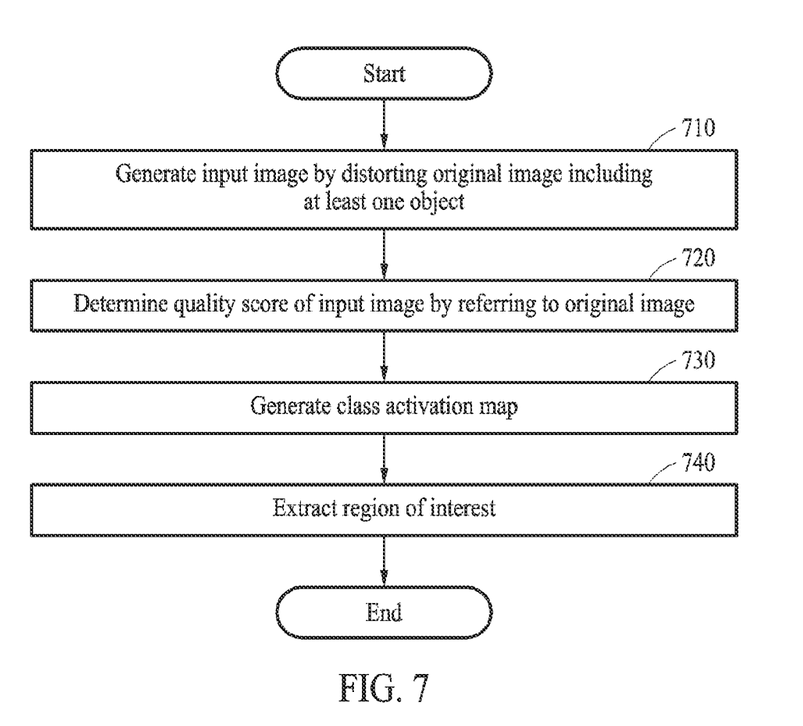
FIG. 7 illustrates an example of an ROI extraction method performed by an ROI extraction apparatus.

FIG. 7 illustrates an example of the ROI extraction method using the full reference image assessment method. As an example, operations 710 through 740 of the ROI extraction method to be described hereinafter may be performed by the ROI extraction apparatus 300 in FIG. 3 or the ROI extraction apparatus 400 in FIG. 4. The operations 710 through 740 may be performed sequentially but not necessarily performed sequentially. For example, the order of the operations 710 through 740 may change and two or more of the operations 710 through 740 may be performed in parallel or simultaneously. Further, one or more of operations 710 through 740 may be omitted, without departing from the spirit and scope of the shown example. In addition to the description of FIG. 7 below, the description of FIGS. 1 through 6 is also applicable to FIG. 7 and is incorporated herein by reference.

Referring to FIG. 7, in operation 710, the ROI extraction apparatus may generate an input image by distorting the original image including at least one object. According to an example, the ROI extraction apparatus may generate a plurality of different input images by distorting the original image using a plurality of different random masks. A method of distorting the original image by the ROI extraction apparatus may be understood by referring to the example described above with reference to FIG. 1.

In operation 720, the ROI extraction apparatus may determine the quality score of the input image by referring to the original image. When the ROI extraction apparatus determines the quality score of the input image by referring to the original image, compared to when the ROI extraction apparatus determines the quality score of the input image without referring to the original image, the reliability and accuracy of the quality score of the input image may be high.

The ROI extraction apparatus may generate a plurality of different input images by distorting the original image using a plurality of different random masks. In operation 720, the operation of determining of the quality score of the input image by the ROI extraction apparatus may include determining the quality score of each of the plurality of input images. An operation in which the ROI extraction apparatus determines the quality score of the input image by referring to the original image may be understood based on the examples described above with reference to FIGS. 3 and 4.

In operation 730, the ROI extraction apparatus may generate a class activation map for the input image based on the quality score of the input image. In operation 740, the operation of extracting the ROI from the original image by the ROI extraction apparatus may include extracting the ROI from the original image based on the quality score of each of the plurality of input images. The operation of extracting the ROI from the original image by the ROI extraction apparatus may be understood based on the examples described above with reference to FIGS. 3 to 5.

The ROI extraction apparatuses, processors, memories, quality evaluation modules, extraction modules, image distortion modules, quantization coefficient generators, image compression modules, ROI extraction apparatus 100, processor 110, memory 120, ROI extraction apparatus 200, processor 210, memory 220, quality evaluation module 212, extraction module 214, ROI extraction apparatus 300, processor 310, memory 320, image distortion module 308, quality evaluation module 312, extraction module 314, ROI extraction apparatus 400, processor 410, memory 420, image distortion module 408, quality evaluation module 412, extraction module 414, ROI extraction apparatus 500, quantization coefficient generator 510, image compression module 520, described herein and disclosed herein described with respect to FIGS. 1-7 are implemented by or representative of hardware components. As described above, or in addition to the descriptions above, examples of hardware components that may be used to perform the operations described in this application where appropriate include controllers, sensors, generators, drivers, memories, comparators, arithmetic logic units, adders, subtractors, multipliers, dividers, integrators, and any other electronic components configured to perform the operations described in this application. In other examples, one or more of the hardware components that perform the operations described in this application are implemented by computing hardware, for example, by one or more processors or computers. A processor or computer may be implemented by one or more processing elements, such as an array of logic gates, a controller and an arithmetic logic unit, a digital signal processor, a microcomputer, a programmable logic controller, a field-programmable gate array, a programmable logic array, a microprocessor, or any other device or combination of devices that is configured to respond to and execute instructions in a defined manner to achieve a desired result. In one example, a processor or computer includes, or is connected to, one or more memories storing instructions or software that are executed by the processor or computer. Hardware components implemented by a processor or computer may execute instructions or software, such as an operating system (OS) and one or more software applications that run on the OS, to perform the operations described in this application. The hardware components may also access, manipulate, process, create, and store data in response to execution of the instructions or software. For simplicity, the singular term "processor" or "computer" may be used in the description of the examples described in this application, but in other examples multiple processors or computers may be used, or a processor or computer may include multiple processing elements, or multiple types of processing elements, or both. For example, a single hardware component or two or more hardware components may be implemented by a single processor, or two or more processors, or a processor and a controller. One or more hardware components may be implemented by one or more processors, or a processor and a controller, and one or more other hardware components may be implemented by one or more other processors, or another processor and another controller. One or more processors, or a processor and a controller, may implement a single hardware component, or two or more hardware components. As described above, or in addition to the descriptions above, example hardware components may have any one or more of different processing configurations, examples of which include a single processor, independent processors, parallel processors, single-instruction single-data (SISD) multiprocessing, single-instruction multiple-data (SIMD) multiprocessing, multiple-instruction single-data (MISD) multiprocessing, and multiple-instruction multiple-data (MIMD) multiprocessing.

The methods illustrated in FIGS. 1-7 that perform the operations described in this application are performed by computing hardware, for example, by one or more processors or computers, implemented as described above implementing instructions or software to perform the operations described in this application that are performed by the methods. For example, a single operation or two or more operations may be performed by a single processor, or two or more processors, or a processor and a controller. One or more operations may be performed by one or more processors, or a processor and a controller, and one or more other operations may be performed by one or more other processors, or another processor and another controller. One or more processors, or a processor and a controller, may perform a single operation, or two or more operations.

Instructions or software to control computing hardware, for example, one or more processors or computers, to implement the hardware components and perform the methods as described above may be written as computer programs, code segments, instructions or any combination thereof, for individually or collectively instructing or configuring the one or more processors or computers to operate as a machine or special-purpose computer to perform the operations that are performed by the hardware components and the methods as described above. In one example, the instructions or software include machine code that is directly executed by the one or more processors or computers, such as machine code produced by a compiler. In another example, the instructions or software includes higher-level code that is executed by the one or more processors or computer using an interpreter. The instructions or software may be written using any programming language based on the block diagrams and the flow charts illustrated in the drawings and the corresponding descriptions herein, which disclose algorithms for performing the operations that are performed by the hardware components and the methods as described above.

The instructions or software to control computing hardware, for example, one or more processors or computers, to implement the hardware components and perform the methods as described above, and any associated data, data files, and data structures, may be recorded, stored, or fixed in or on one or more non-transitory computer-readable storage media, and thus, not a signal per se. As described above, or in addition to the descriptions above, examples of a non-transitory computer-readable storage medium include one or more of any of read-only memory (ROM), random-access programmable read only memory (PROM), electrically erasable programmable read-only memory (EEPROM), random-access memory (RAM), dynamic random access memory (DRAM), static random access memory (SRAM), flash memory, non-volatile memory, CD-ROMs, CD-Rs, CD+Rs, CD-RWs, CD+RWs, DVD-ROMs, DVD-Rs, DVD+Rs, DVD-RWs, DVD+RWs, DVD-RAMs, BD-ROMs, BD-Rs, BD-R LTHs, BD-REs, blue-ray or optical disk storage, hard disk drive (HDD), solid state drive (SSD), flash memory, a card type memory such as multimedia card micro or a card (for example, secure digital (SD) or extreme digital (XD)), magnetic tapes, floppy disks, magneto-optical data storage devices, optical data storage devices, hard disks, solid-state disks, and/or any other device that is configured to store the instructions or software and any associated data, data files, and data structures in a non-transitory manner and provide the instructions or software and any associated data, data files, and data structures to one or more processors or computers so that the one or more processors or computers can execute the instructions. In one example, the instructions or software and any associated data, data files, and data structures are distributed over network-coupled computer systems so that the instructions and software and any associated data, data files, and data structures are stored, accessed, and executed in a distributed fashion by the one or more processors or computers.

While this disclosure includes specific examples, it will be apparent after an understanding of the disclosure of this application that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents.

Therefore, in addition to the above and all drawing disclosures, the scope of the disclosure is also inclusive of the claims and their equivalents, i.e., all variations within the scope of the claims and their equivalents are to be construed as being included in the disclosure.

What is claimed is:

1. An apparatus with region of interest (ROI) extraction, the apparatus comprising:
   one or more processors; and
   a memory comprising one or more non-transitory storage media that store instructions that, when executed by the one or more processors, configures the apparatus to:
   generate an input image by distorting an original image comprising one or more objects;
   determine, based on the original image, a quality score of the input image using a machine learning model that is trained based on a mean opinion score (MOS) dataset;
   generate a class activation map for the input image based on the quality score of the input image; and
   extract an ROI from the original image based on the class activation map.

2. The apparatus of claim 1, wherein, for the extracting of the ROI, the execution of the instructions further configures the apparatus to extract the ROI by binarizing the class activation map.

3. The apparatus of claim 1, wherein
   the class activation map comprises a plurality of pixels,
   one or more portions of the plurality of pixels has different pixel values, and
   for the extracting of the ROI, the execution of the instructions further configures the apparatus to extract the ROI from the original image based the different pixel values of the plurality of pixels of the class activation map and a threshold value.

4. The apparatus of claim 3, wherein, for the extracting of the ROI, the execution of the instructions further configures the apparatus to determine pixels of the plurality of pixels of the class activation map having pixel values higher than the threshold value as included in the ROI.

5. The apparatus of claim 1, wherein, for the generating of the input image, the execution of the instructions further configures the apparatus to generate the input image by blurring the original image.

6. The apparatus of claim 1, wherein the execution of the instructions further configures the apparatus to:
   for the generating of the input image, generate a plurality of different input images by distorting the original image using a plurality of different random masks;
   for the determining of the quality score, determine a quality score of each of the plurality of different input images; and
   for the extracting of the ROI, extract the ROI based on the quality score of each of the plurality of different input images.

7. The apparatus of claim 6, wherein
   the plurality of different random masks is configured to distort different regions of the original image, and
   the execution of the instructions further configures the apparatus to:
   determine a quality score of the original image; and
   for the extracting of the ROI, extract the ROI based on a difference between the quality score of each of the plurality of different input images and the quality score of the original image.

8. The apparatus of claim 1, wherein, for the determining of the quality score, the execution of the instructions further configures the apparatus to input the original image and the input image as an input to the machine learning model.

9. The apparatus of claim 1, wherein the execution of the instructions further configures the apparatus to:
   quantize pixel values of pixels included in the ROI and convert the quantized pixel values into a block-based data map; and
   generate a compressed image in which the original image is compressed, based on the block-based data map.

10. An apparatus with region of interest (ROI) extraction, the apparatus comprising:
    one or more processors; and a memory comprising one or more non-transitory storage media that store instructions that, when executed by the one or more processors, configures the apparatus to:
  determine a quality score of an input image using a machine learning model that is trained based on a mean opinion score (MOS) dataset;
  generate a class activation map for the input image based on the quality score of the input image; and
  extract an ROI from an original image of the input image based on the class activation map.

11. The apparatus of claim 10, wherein, for the extracting of the ROI, the execution of the instructions further configures the apparatus to extract the ROI by binarizing the class activation map.

12. The apparatus of claim 10, wherein
  the class activation map comprises a plurality of pixels,
  one or more portions of the plurality of pixels has different pixel values, and
  for the extracting of the ROI, the execution of the instructions further configures the apparatus to extract the ROI from the original image based on the different pixel values of the plurality of pixels of the class activation map and a threshold value.

13. The apparatus of claim 10, wherein the quality score of the input image is determined by the machine learning model using only the input image without the original image.

14. A processor-implemented method with region of interest (ROI) extraction, the method comprising:
  determining a quality score of an input image distorted from an original image;
  comprising one or more objects, using a machine learning model trained based on a mean opinion score (MOS) dataset;
  generating a class activation map for the input image based on the quality score of the input image; and
  extracting an ROI from the original image based on the class activation map.

15. The method of claim 14, wherein the extracting of the ROI from the original image based on the class activation map comprises extracting the ROI by binarizing the class activation map.

16. The method of claim 14, wherein
  the class activation map comprises a plurality of pixels,
  one or more portions of the plurality of pixels has different pixel values, and
  the extracting of the ROI from the original image based on the class activation map comprises extracting the ROI from the original image based the different pixel values of the plurality of pixels of the class activation map and a threshold value.

17. The method of claim 14, further comprising generating the input image by distorting the original image,
  wherein the determining of the quality score of the input image comprises determining the quality score of the input image based on the original image.

18. The method of claim 14, further comprising generating a plurality of different input images by distorting the original image using a plurality of different random masks,
  wherein the determining of the quality score of the input image comprises determining quality scores of each of the plurality of different input images, and
  wherein the extracting of the ROI comprises extracting the ROI from the original image based on the quality scores of each of the plurality of different input images.

19. A non-transitory computer-readable storage medium storing instructions that, when executed by one or more processors, configure the one or more processors to perform the method of claim 14.

* * * * *